(12) United States Patent
Richard et al.

(10) Patent No.: US 6,484,160 B1
(45) Date of Patent: Nov. 19, 2002

(54) PROCESS FOR OPTIMIZING ACCESSES TO A DATABASE

(75) Inventors: Jean-Luc Richard, Paris; Alain Grignac, Le Chesnay, both of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/338,547

(22) Filed: Jun. 23, 1999

(30) Foreign Application Priority Data

Jun. 30, 1998 (FR) .............................. 98 08294

(51) Int. Cl.⁷ .............................................. G06F 17/30
(52) U.S. Cl. ....................... 707/2; 707/1; 707/3; 707/4; 707/103; 707/104; 709/315; 709/316
(58) Field of Search ........................... 707/1, 103, 104, 707/4, 2, 3; 709/316, 315

(56) References Cited

U.S. PATENT DOCUMENTS

| | | | | |
|---|---|---|---|---|
| 5,694,597 A | * | 12/1997 | Cantin et al. ............... | 707/104 |
| 6,003,040 A | * | 12/1999 | Mital et al. ................. | 707/103 |
| 6,128,611 A | * | 10/2000 | Doan et al. .................... | 707/4 |
| 6,182,156 B1 | * | 1/2001 | Togawa ...................... | 709/316 |
| 6,189,012 B1 | * | 2/2001 | Mital et al. ................. | 707/103 |
| 6,226,691 B1 | * | 5/2001 | Cantin et al. ............... | 709/316 |
| 6,266,708 B1 | * | 7/2001 | Austvold et al. ........... | 709/315 |

OTHER PUBLICATIONS

Chan et al., "Indexing OODB instances based on access proximity", IEEE, 1997, pp. 14–21.*
Bertino et al., "Optimization of Object–Oriented Queries Using Path Indices", IEEE, 1992, pp. 140–149.*

* cited by examiner

*Primary Examiner*—Charles L. Rones
*Assistant Examiner*—Thuy Pardo
(74) *Attorney, Agent, or Firm*—Miles & Stockbridge P.C.; Edward J. Kondracki

(57) ABSTRACT

The invention relates to a process for optimizing accesses to a database. This process allows client applications to request a CMIS-DB server, via an online configuration, to customize the generic representation for the object classes for which the access times must be optimized in order to reduce the search times for the object instances selected, by performing a step for configuring the physical storage of an object class to be optimized, which consists in the creation of an object instance of the storage definition class (mocStorageDefinition), in which are declared the attribute or attributes of the class to be optimized, which will be indexed when physically stored on a disk.

22 Claims, 4 Drawing Sheets

PROCESS FOR OPTIMIZING ACCESSES TO A DATABASE

BACKGROUND OF THE INVENTION

1. Field of the Invention

The present invention relates to a process for optimizing accesses to a database.

2. Description of Related Art

Information Management Services for access to the information of an MIB (Management Information Base) are based on the CMIS standard (Common Management Information Service, ITU-T recommendation T X.710), which describes the operations that can be performed on specified objects in accordance with the model of the GDMO standard (Guidelines for the Definition of Managed Objects, ITU-T recommendation X.722).

Figure 2:
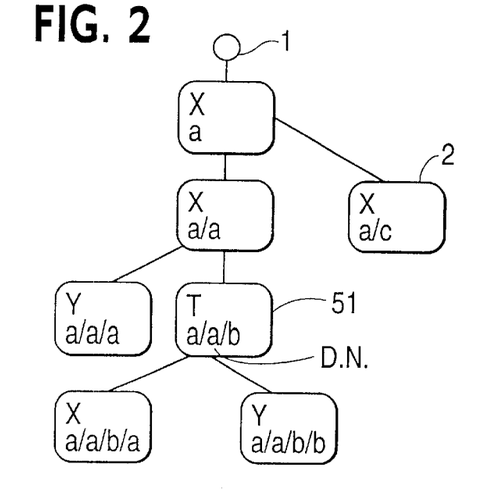
FIG. 2 represents an object tree constituting a part of the MIB.

The present invention uses the information management service in the CMIS standard. This service is attached to the CDSP (CMIS Dispatcher Process) (FIG. 4, 42), which is a service for exchanging CMIS packets between entities of the OpenMaster™ platform. Which is an enterprise management software suite of BULL S.A., a French company, having offices at Louveciennes, France. OpenMaster™ is a total enterprise-wide solution involving security, asset management, application deployment and system and network operations, all linked by an underlying, integrated, open and flexible architecture. Further information regarding OpenMaster™ software suite can be obtained at http://www.openmaster.com. CDSP is a packet router for the management information service, i.e., a system for transferring data between two entities using the same protocol. The management applications call either agents (43a, 43b, 43c) or local services of the platform that make it possible to locally manage a Management Information Base (MIB) organized hierarchically in the form of an object tree, without network access. In these management information bases (MIB), all the resources are represented in the form of objects in an object tree, as represented in FIG. 2.

The objects themselves are grouped into classes. An object of a given class has a certain number of attributes, and each object instance has a distinguished name (DN). Addressing is done by means of a distinguished name (DN). For example, the DN of the object (51, FIG. 2) is "a/a/b".

Figure 4:
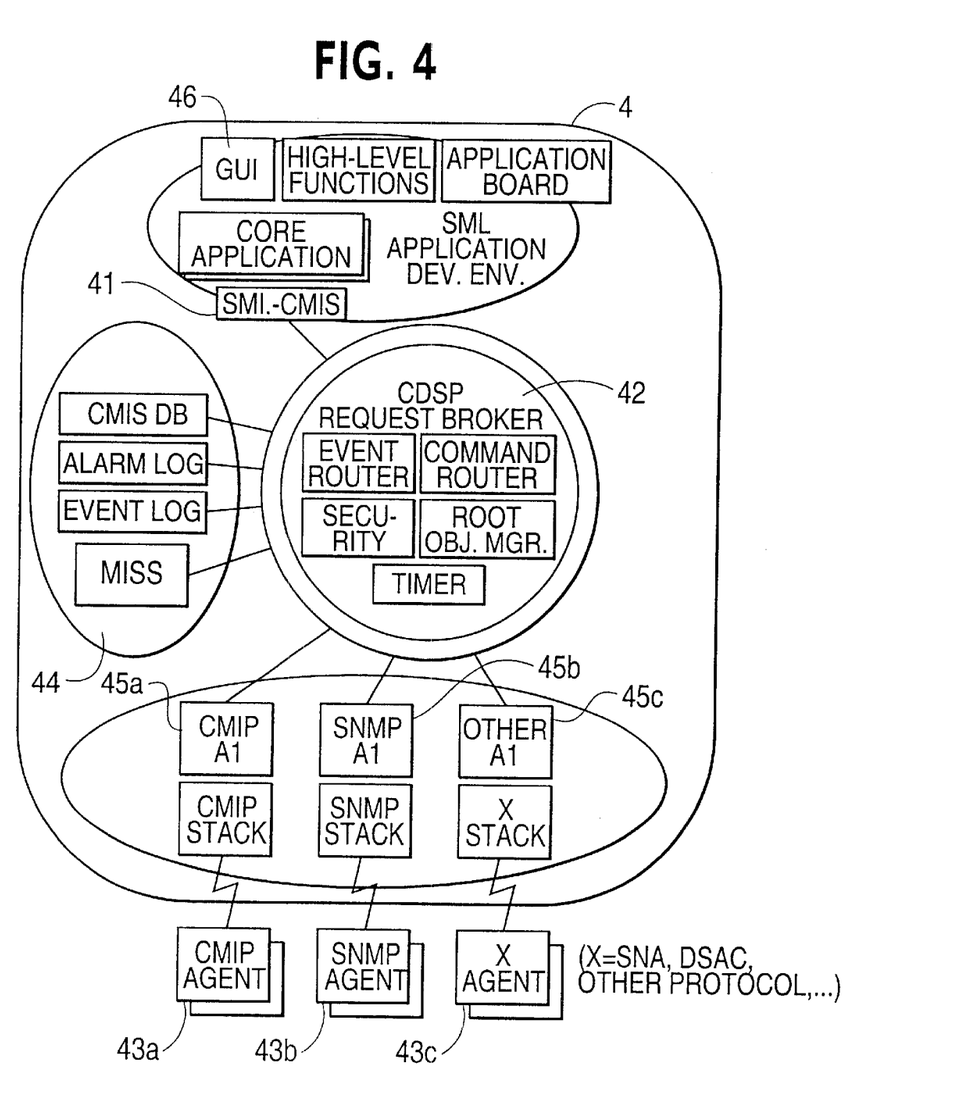
FIG. 4 represents the architecture of the manager entity of the OpenMaster™ product.

FIG. 4 represents the operation of an information management service. This service uses a two-level architecture. The first level is constituted by a manager entity (4) playing the role of a manager that must display and monitor resources, look up characteristics, etc. The second level is constituted by remote or local agent entities (43a through 43c), which maintain the objects to which the operations sent by the manager level are to be applied. The purpose of an agent is to maintain a model of the resource it manages, a standardized model journaled in an MIB. At least one agent is installed in each machine of the network and can control a set of local or remote resources under the direction of one or more managers. A manager communicates with each agent using a standard management protocol. The OpenMaster™ management system marketed by the French company BULL, S.A. comprises one or more managers called ISM (Integrated System Management) and a plurality of agents (ISM Agent). Moreover, other agents marketed by other companies can be controlled by the OpenMaster™ manager via standard protocols.

The manager-agent mechanism is based on an object model in which the modeling of a resource constituted, for example, by elements of the system, software, states, users, etc., is based on an object-oriented approach and structuring of the management information. The "real" equipment of a networked system (a computer, a printer, a circuit, etc.) is represented by abstract objects organized into a management information base (MIB). The characteristics of these objects (the name of a computer, the characteristics of the peripheral equipment, the status of this equipment such as a printer, etc.) are called the attributes of the objects.

The objects are divided into what are most often called MOCs (Managed Object Classes), in which each MOC represents a type of resource. The MOCs define the information that the MIB will contain for each type of resource, i.e., what attributes the object will have. The MOCs can be interpreted as being part of the "schema" of the MIB. The manager records an object class MOC in the GDMO language, and it declares, among other things, the classes, and for each class, a list of attributes, name bindings, etc. This description is recorded in a GDMO object definition module attached to the manager ISM (41). Each MOC is instantiated in several MOIs (Managed Object Instances) representing the actual occurrences of this type of resource.

Take the example of three printers (Print1, Print2, Print3) represented by three object instances (P1, P2, P3) in a management information base (MIB). The attributes of the object representing the printer are "printer status" and "user". It is therefore possible to define an object class MOC "printers" having "printer status" and "user" as its attributes. The object instances (MOIs) of the class "printers" can be the following:

| MOI | MOC | ATTRIBUTES | |
| --- | --- | --- | --- |
| (instance) | Class | printer status | user |
| Print 1 | Printers | activated | none |
| Print 2 | Printers | deactivated | none |
| Print 3 | Printers | activated | Joe |

The status of the resource Print activated without the current user in the instantiation of the above example. This example also includes the instances Print 2 and Print 3. An application such as "ISM Monitor" supplied by the Open-Master™ management system (4) makes it possible to display the MOIs and their statuses. Likewise, ISM Monitor (46) can display, in table form, the attributes of any MOI, for example the attributes "printer status" and "current user" for any MOI of the MOC "Printers".

The entire set of managed objects forms a management information base (MIB).

A sub-tree directly attached to the root of the distinct tree of a management information base (MIB) is called an "MIBlet". In spite of the division into MIBlets, the management information base (MIB) of the OpenMaster™ management system is recognized as a single composite entity, with all the MIBlets attached to the same MIB. An object MOI at the root of a MIBlet is called a "Rootlet". The OpenMaster™ manager views the distributed system through the objects of the MIB and the system is controlled by manipulating objects of the MIB and their attributes. The objects are visible via the agents or the object manager attached to the OpenMaster™ manager, which map the equipment in an MIB in the form of an object tree. An agent can represent the status of a piece of equipment via a corresponding associated object represented in the MIB. This mapping can associate an object with several "real"

pieces of equipment; likewise, a piece of equipment can be modeled in the form of several objects. The OpenMaster™ manager (4) sends commands to the agents (43a through 43c) and the agents (43a through 43c) send responses to its commands and notify the OpenMaster™ manager (4) of events through integrating agents (45a), using a protocol such as SNMP (Simple Network Management Protocol, 45a), CMIP (Common Management Information Protocol, 45b), or others such as DSAC/AEP (Distributed Systems Administration and Control/Administrative Exchange Protocol) (45c). Each management protocol provides a certain number of simple operations; for example, the protocol CMIP provides all the functions of the CMIS standard, i.e., the following:

the manager (41) can read the attributes of an MIB object (the operation M-GET). The agent (43) responds to a query M-GET by providing information on the equipment;

the manager (41) can modify the attributes of an MIB object (the operation (M-SET). The agent (43) modifies the "real" equipment as a function of the new attribute values provided by the manager;

the manager (41) can create and delete objects of the MIB (the operations M-CREATE and M-DELETE);

the manager (41) can perform an action on an MIB object (the operation M-ACTION). The agent (43) performs an action on the equipment as a function of the action requested by the manager on the abstract object;

the agent (43) can notify the manager of an event taking place in an object of the MIB (the operation M-EVENT). The agent sends information on an event involving an abstract object in order to describe an event that took place in a "real" piece of equipment.

A management information base (MIB) has a strict tree structure hierarchy, which means that each object instance (MOI) has one and only one superior MOI. The tree formed by the management information base is called a "containment tree." The managed object instances (MOIs) are named by their position in the containment tree in the following way:

Each MOI has a relative distinguished name (RDN) which differentiates the MOIs having one and the same superior (father) MOI. One of the attributes of each managed object class (MOC) is chosen to specify the RDN of the instance for a given superior MOI. This attribute, called the naming attribute, is identified in the GDMO templates known as name bindings. An MOC can have several potential superior name bindings, but each MOI uses only one of them. Each MOI also has a full distinguished name (Full Distinguished Name) that is unique in the MIB. The global distinguished name (DN) of an object consists of its relative distinguished name (RDN) joined with the distinguished name (DN) of its superior, which means that the distinguished name (DN) of a managed object instance (MOI) contains its own relative distinguished name (RDN), plus the relative distinguished names (RDNs) of all its superiors in the containment tree up to the root.

The management information base (MIB) makes it possible to establish relationships between objects other than the relationships established in the containment tree by distinguished names. These relationships are established using relationship attributes. These attributes contain the global distinguished names (DN) of other objects. They are used as references from one object to another.

One of the local object managers of the manager ISM-Manager is called CMIS-DB. It is responsible for storing part of the local MIB. The remanence of these stored objects is ensured by ISAM (Index Sequential Access Method) files. This ISAM technology, which describes the structures of records, is a method for accessing files structured in the form of records divided into one or more indexes and data.

When the application of the manager wishes to select one of the objects in order to perform a CMIS operation, for example an M-GET, it must specify the base object instance (BOI), the scope and the "filter" as arguments of the operation.

The base object instance (BOI) makes it possible to identify an object in a management information base (MIB), which is the starting point for an evaluation of the scope-filter pair in the object tree. The scope selects a portion of the tree from this base object. For example, the scope "Whole sub-tree" makes it possible to select all the sub-trees of a given object. Among all the objects in the scope, the objects selected are those for which the evaluation of the filter is true. The operation is performed on the objects actually selected. The manager sends an M-GET on the objects and CMIS-DB reads and returns to the application the value of the attributes of the objects selected.

In order to reach a base object instance (BOI), the manager CMIS-DB must go from father object to son object until it reaches the node of the base object. This navigation operation can be lengthy if, in order to go from one node to another, it is necessary to physically read all the sons of a node and choose from among them the one that has the right RDN, and so on. Once the computer has reached the base object instance, it must read the attributes of the objects of the base that correspond to the scope in order to be able to evaluate the filter in storage. The generic condition for storing objects imposed by the old version of CMIS-DB is to physically read all the selected objects belonging to the scope before evaluating the filter in storage. When there are a lot of objects subordinate to an object, performance can be quite poor. In order to understand the problem, it is important to remember that the generic storage in the previous versions of CMIS-DB made it possible to manage objects in the base without requiring a pre-declaration of their format in the server. This is an advantage over other systems, which first require compiling the description of the objects in the object base in order to be able to process them, and therefore does not make it possible to create an instance of the class of the objects if this class has not been described. CMIS-DB, on the other hand, performs this operation automatically, but the generic storage of the objects of the MIB by default results in the performance problems described above. CMIS-DB uses data structures that make it possible to generically create instances of any object class of the MIB on the physical disk of the system, without having prior knowledge of the description in accordance with GDMO.

In the generic representation of CMIS-DB, knowledge of the structure of the objects is obtained during the CMIS operations M-CREATE for creating instances, sent by the client applications to the server CMIS-DB.

SUMMARY DESCRIPTION OF THE INVENTION

It is the applications that correctly format the M-CREATE operations by using online the GDMO descriptions recorded in the OpenMaster™ module, which compiles and stores the GDMO definitions of the objects managed by the manager ISM.

One object of the present invention is to offer a process for optimizing accesses to a database organized into trees, particularly for a management server managing a very large management information base (MIB), making it possible to perform complex operations on a very large number of objects while reducing the search times for the instances selected by the scope and filter arguments of CMIS operations.

This object is achieved by the fact that the process for optimizing accesses to a database is characterized in that it allows the client applications to request the CMIS-DB server, via an online configuration, to customize the generic representation for the object classes for which the access times must be optimized in order to reduce the search times for the object instances selected, by performing a step for configuring the physical storage of an object class to be optimized, which consists in the creation of an object instance of the storage definition class (mocStorageDefinition) in which are declared the attribute or attributes of the class to be optimized, which will be indexed when physically stored on a disk.

According to another characteristic, the process comprises a second step consisting of writing one ISAM (Index Sequential Access Method) file per managed object class (MOC) optimized, a specific file with its own index structure containing the representation of all the instances of this MOC.

According to another characteristic, the process comprises a third step consisting of analyzing the filters conveyed by the CMIS operations sent by the users in order to identify, in a pre-filtering step, whether or not the evaluation of this filter can be performed using one of the indexes set in the base.

According to another characteristic, the value of the physical indexes for indexing the attributes specified in the object instance of the class mocStorageDefinition corresponding to the MOC to be optimized includes the unique 4-byte long reference of the node of the father instance (fatherMOInodeRef) of the managed object instance and the sequence of the attributes 1 through i necessary to the managed object class to be optimized.

According to another characteristic, when a pre-filtering by the attributes indexed in the underlying database can be used, the query performer in the management information base (MIB query performer) determines the arguments of the physical read operation, making it possible to reread in the underlying base only the subordinates that are indexed by the values of the attributes selected for the pre-filtering.

According to another characteristic, the managed object class (mocStorageDefinition) makes it possible to specify a plurality of indexable attributes that will be physically stored in the index the moment the object is created.

According to another characteristic, the plurality of indexes described in the managed object class mocStorageDefinition can be reorganized at any time by assigning a different index level to one or more attributes or by activating or deactivating the indexes via the modification of the object of class mocStorageDefinition.

According to another characteristic, a query performing module of the information management service CMIS-DB, after detecting a possibility for pre-filtering through the knowledge of the mocStorageDefinition of each class optimized, performs the reading in the underlying database of only the objects of the scope that are indexed by the values of the attributes selected for the pre-filtering.

According to another characteristic, means are provided to allow the user to choose the most discriminating attribute or the attribute group by sorting the defined indexes in decreasing order.

According to another characteristic, the optimizer recognizes the filters than can result in a pre-filtering for the indexes; these are the filters constituted by an AND clause including:

an equality item in the attribute objectClass, a value equal to the identifier of one of the optimized MOCs, a logical expression constituted only by AND clauses including comparison items in the attributes declared in the indexes of this optimized MOC.

BRIEF DESCRIPTION OF THE DRAWINGS

Other characteristics and advantages of the present invention will emerge more clearly through the reading of the following description given in reference to the attached drawings in which.

DESCRIPTION OF THE PREFERRED EMBODIMENTS

The basic concept of the invention is to use an indexing mechanism that is found in indexed files of the ISAM (Index Sequential Access Method) type or in relational or object-oriented databases so as to be able to index certain object attributes. It must be remembered that the physical storage of information requires choosing a basic technology. Primarily, there is object-oriented database technology, relational database technology and ISAM technology. The choice of ISAM files for the physical storage of an MIB is known in the old versions of a common management information service not indexable for a database CMISNI-DB and is still used in the current version. But the same mechanism can be applied to other basic technologies such as ODBMS (Object-oriented Database Management Systems) and RDBMS (Relational Database Management Systems). Therefore, the process described does not limit the physical storage mechanism to ISAM technology alone.

The records in an ISAM file are indexed. There are two possibilities for accessing a record directly: either to provide the number of the record, or to perform a search on one of the values that is declared as an index field in the record. ISAM implements an algorithm that makes it possible to reduce the number of physical searches: the "B+trees" form data structures that make it possible to accelerate the physical searches for strings by calculating keys and creating intermediate tables. Using a desired value, the "B+trees" make it possible to perform fast accesses in order to retrieve, as quickly as possible, only the records that have this value in the index. Thus, the computer can physically search the disk for all the records that have a certain index value. This operation is faster than reading all the records one by one, and checking in storage to see if the value read corresponds to the value requested.

In order create a set of objects in a base, most of the agents that handle management information bases MIB request to know to know the definition, in GDMO language, of the managed objects.

Figure 1:
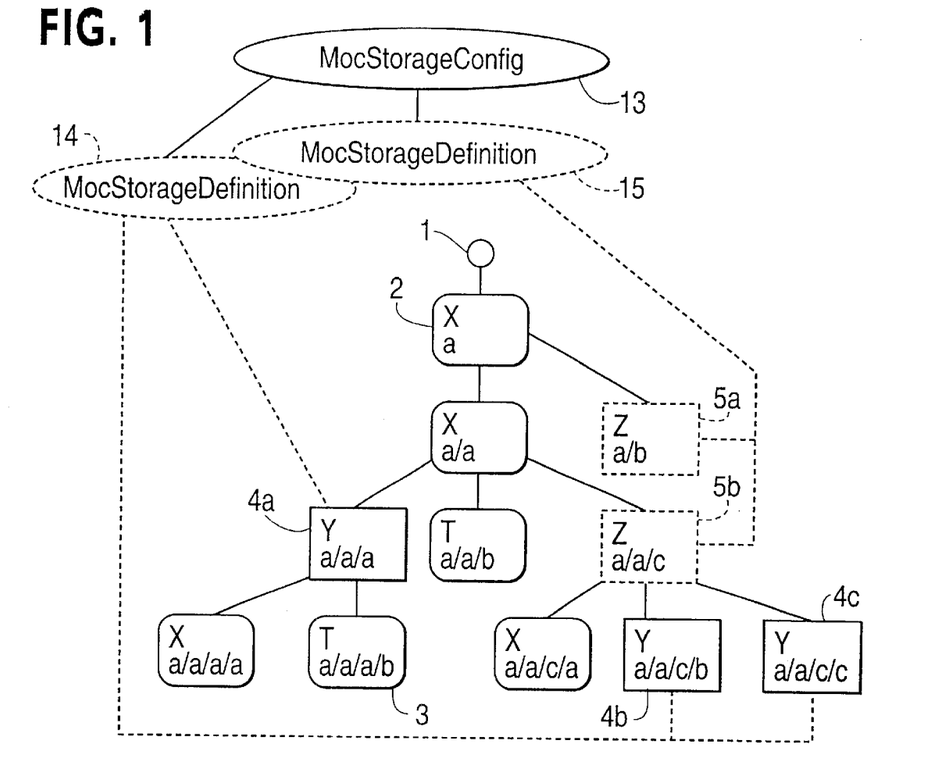
FIG. 1 represents an exemplary management information base (MIB) stored in an indexed common information management service (CMIS-DB)

In the present invention, CMIS-DB is able to create objects without knowing their GDMO definitions by representing them in the base generically. The present invention allows the user to index the instances of the managed object classes (MOI) he queries most often. To do this, the manager must create a particular object instance of a class called "mocStorageDefinition," in which the manager describes the definition of the structure of the indexes that will be applied to the managed object instances of the class (MOC) to be optimized. Thus, as represented in FIG. 1, the manager has created one object instance of class mocStorageDefinition (15) for the object class Z (5a, 5b) and another instance for the object class Y (4a, 4b, 4c). Thus, for each type of managed object class (MOC) optimized, an ISAM file is created in which its key is divided in two, one key being for ISAM a simple field identified in the record of the file. The first part contains the reference of the father of the instance and is used by the browser, and the second part contains the value or values of the indexed attributes of this instance.

The present invention therefore allows the user to define an indexed physical representation different from the generic representation of CMIS-DB, to optimize the most frequent accesses. In fact, in order to optimize the searches for instances of a certain number of managed object classes (MOC), the user has the capability to declare the managed object classes (MOC) whose consultation he wishes to optimize. The optimization consists of choosing in a given managed object class (MOC) the attribute or attributes intended to be used as filtering criteria in the searches that the user wishes to optimize. These attributes are called "indexed attributes." From this or these attributes chosen, the module CMIS-DB will deduce one or more new indexes to incorporate into the representation of the instances of this managed object class (MOC). An optimized managed object class (MOC) is therefore represented by a type of node (5, 4; FIG. 1) that is physically different from the generic node (2, 3; FIG. 1) and specific to each of the optimized managed object classes (MOC).

The configuration object (mocStorageConfig) contains all of the classes "mocStorageDefinition" (14, 15) defined for the module CMIS-DB. The class "mocStorageDefinition" (14, 15) allows the user to define, for each class to be optimized identified by the identifier "mocID", what the attributes to be indexed are. The authorized operations on the objects of class "mocStorageDefinition" are:

the objects M-CREATE and M-DELETE in a database CMIS-DB that no longer contains any instance of the class to be optimized, the operations M-GET the operations M-SET on only the attributes "usedIndex" and index 1, index 2, index 3, index 4 and index 5.

The description in GDMO language of the class mocStorageDefinition is the following:

```
mocStorageDefinition        MANAGED OBJECT CLASS
        DERIVED FROM      "Rec. X.721 | ISO/IEC   10165-2:
1992":top;
            CHARACTERIZED BY   mocStorageDefinitionPkg PACKAGE
            BEHAVIOR              mocStorageDefinitionBehavior;
            ATTRIBUTES
                mocID                  GET,
                optimizerAdminState    GET-REPLACE,
                indexableAttributes    GET,
                index 1                GET-REPLACE,
                index 2                GET-REPLACE,
                index 3                GET-REPLACE,
                index 4                GET-REPLACE,
                index 5                GET-REPLACE,
                usedIndex              GET-REPLACE
        REGISTERED AS {ODS-ASN1Module.ods-objectClass10};
        optimizer AdminState      ATTRIBUTE
          WITH ATTRIBUTE SYNTAX    ODS-ASN1Module.OptimizerState;
          MATCHES FOR         EQUALITY;
          BEHAVIOR            optimizerAdminStateBehavior BEHAVIOR
              DEFINED AS              indicates whether the pre-selector of
                                      the MOIs using the accesses indexed in
                                      this optimized MOC should be used
                                      (unlocked) or whether it is deactivated
                                      (locked). In the latter case, the
                                      algorithm for evaluating the scope/
                                      filters applied is the same as in the
                                      case of the generic representation of
                                   the MOCs. The default value of
                                      optimizerAdminState is activated. ;;
                REGISTERED AS {ODS-ASN1Module.ods-attribute 20};
        indexableAttributes              ATTRIBUTE
          WITH ATTRIBUTE SYNTAX    ODS-ASN1Module.IndexableAttributes;
          BEHAVIOR                 indexableAttributesBehavior BEHAVIOR
          DEFINED AS               Describes the potentially indexable
                                   attributes.
        indexOfMOI                 ATTRIBUTE
          WITH ATTRIBUTE SYNTAX    ODS-ASN1Module.IndexDefinition;
          BEHAVIOR                 indexBehavior BEHAVIOR
          DEFINED AS               Describes the current structure of an
                                   index, in the form of a list of the
```

-continued

```
              indexed attributes.
index1        ATTRIBUTE
   DERIVED FROM   indexOfMOI;
   REGISTERED AS {ODS-ASN1Module.ods-attribute 21 };
   -- Idem for index2, index3, index4 and index5
   usedIndex              ATTRIBUTE
   WITH ATTRIBUTE SYNTAX  ODS-ASN1Module.SetOfIndex;
   MATCHES FOR            EQUALITY
   BEHAVIOR               usedIndexBehavior BEHAVIOR
   DEFINED AS             Contains the list of the indexes that
                          are actually used, among the N potential
                          indexes declared in the attributes
                          index1, . . . index N. The only modification
                          operations authorized are ADD-MEMBER or
                          REMOVE-MEMBER;;
REGISTERED AS {ODS-ASN1Module.ods-attribute 26};
```

All the CMIS operations related to the objects managed by CMIS-DB are routed between the management application and CMIS-DB by the communication infrastructure (CDSP) of the manager entity of OpenMaster™. Thus, CMIS-DB is considered by the OpenMaster™ applications to be an object manager that stores and manages part of the MIB in a database.

The server CMIS-DB interacts with the CDSP (33, FIG. 3) through an interface (32). The interactions between all the components of the manager ISM are achieved by means of CMIS messages routed by CDSP.

Figure 3:
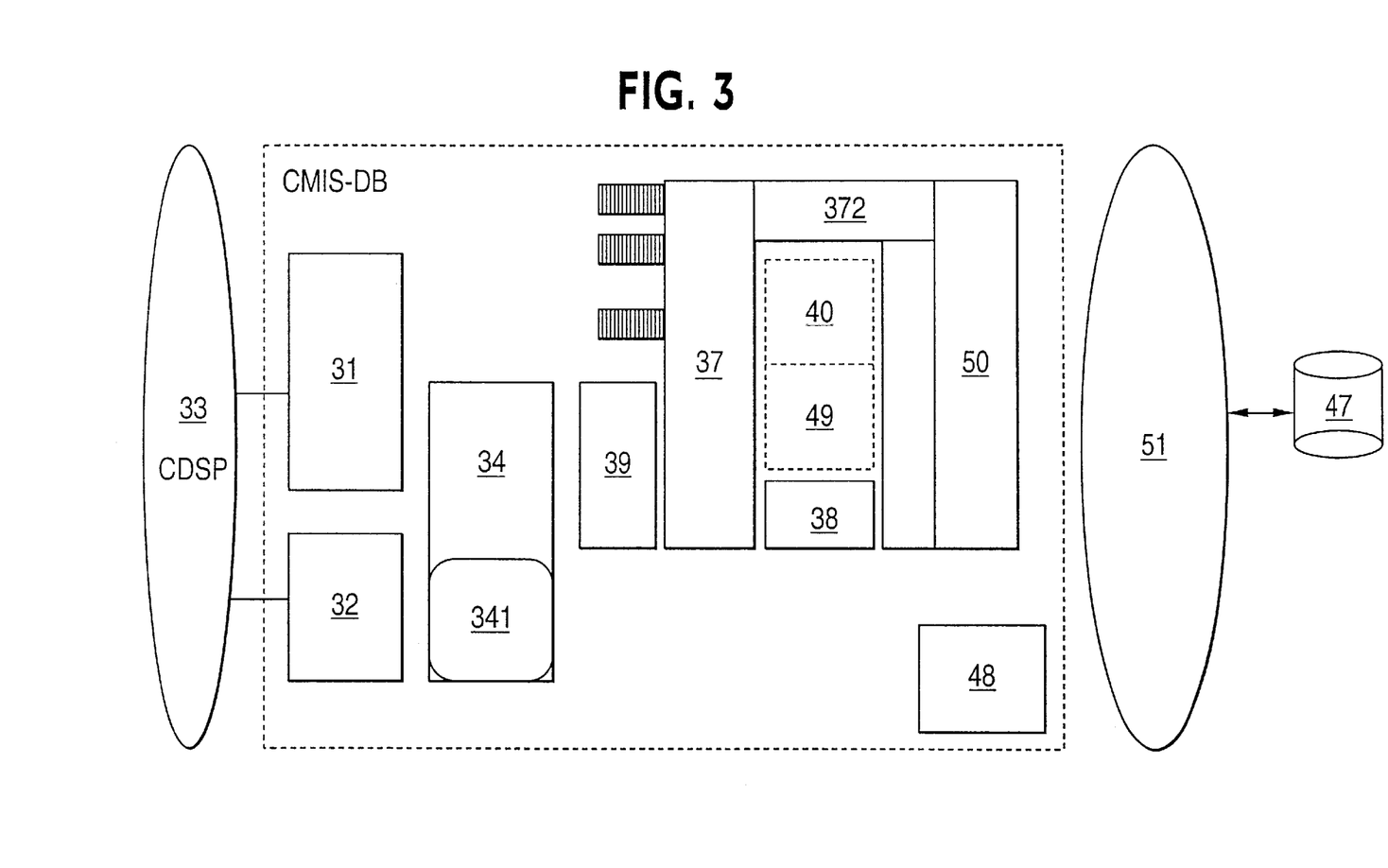
FIG. 3 represents the architecture of the information management module for a database CMIS-DB.

FIG. 3 represents the architecture of CMIS-DB according to the invention, which comprises a CMIS operations handler (31) that dialogues using the protocol of the CDSP (33) with the communication infrastructure, a programmable user extension module coded in SML (SML MIB toolkit) (34), a module (37) divided into a query performing sub-module (MIB query performer), a navigation and scope-and-filter evaluation sub-module, and a sub-module for optimization by pre-filtering (372), a translator from a global form into a local form (38), an import/export module (39), a cache of the object containment tree (40), a cache of the managed object instances (MOIs) (49), a module for accessing the physical memory (50) that interfaces the server of the underlying database (51), a physical access transaction management module (storage transaction manager) (48) and a physical disk (47).

The program development kit (SML MIB toolkit) (34) loads the user's possible SML (Systems Management Language) extensions (341) and provides, in SML, the primitives for access to the management information base (MIB) managed by the service CMIS-DB. In addition, the program development kit (SML MIB toolkit) (34) evaluates the pre-conditions and the post-conditions set by the user at the time of each operation in the management information base (MIB) and executes the SML extensions that are activated under these conditions.

The query performer (37) in the management information base actually executes the query or the operation on the logical representation of the management information base (MIB). It navigates as a function of the argument of the base object instance (BOI, baseObjectinstance) of the query, in order to obtain the initial instance of the evaluation of the scope and of the filter.

The operating mode of the query performer (37) of the management information base (MIB query performer) depends on the arguments of the scope and "filter" operations of the operation. When no pre-filtering by the attributes indexed in the underlying database can be used, the query performer of the management information base (MIB query performer) (37) browses the list of all the sons to read the managed object instances (MOI) corresponding to the scope.

The decision for learning whether or not a pre-filtering can be performed depends on the analysis of the structure of the filter.

The optimized search of the MOIs selected by a filter consists not of physically reading all the MOIs belonging to the CMIS scope so as to apply the evaluation of the filter to them, but of using, whenever possible, the indexes that have been set on their so-called optimized MOCs, so as to read only one subset of these instances MOI. This last operation is called a "preselection or pre-filtering"; it does not replace the step for evaluating the filter in each returned MOI in memory, which takes place systematically in both cases. The pre-filtering by the indexes can therefore return MOIs that in the end will be rejected by the CMIS filter evaluation step, but it must not forget to read only one of the MOIs of the scope that verify the filter.

The CMIS filters must necessarily conform to a defined structure in order to be recognized by the optimizer for searching for the MOIs that these filters select.

Except for the scope "base object only", which does not involve the optimization mechanism, the type of scope used in the queries has no effect on the rules that make it possible to decide whether a preliminary selection by the indexes is more optimum than a physical reading of all the MOIs belonging to the scope.

A CMIS filter recognized by the optimizer must be a logical expression that selects only MOIs of the same class. This class must be one of the optimized MOCs declared in the module CMIS-DB.

This logical expression must be constituted by an AND clause including:
  an equality item in the attribute objectClass, a value equal to the identifier of one of the optimized MOCs.
  a logical expression constituted only by AND clauses including comparison items in the attributes declared in the indexes of the optimized MOCs. These comparisons in the indexed attributes can only be equalities, except when one of the operations greaterOrEqual, lessOrEqual or initialString relates to the last element of the index (or the initial part of the index) selected. For example, for an optimized moc constructed with several indexes constituted by the attributes (att. 1; att. 2; att. 3), the logical expression could be the following:

att.1=value1 & att.2=value2 & att.3=value3 and possibly another logical expression that relates to the attributes that are not declared in the indexes of the MOC identified.

More formally, the description of the CMIS filters recognized by the pre-filtering is expressed by the following grammar:

| | |
|---|---|
| optimumCMISFilter anyFilterItems | → and mocFilterItems     indexFilterPart |
| mocFilterItems | → equality <X.721:objectClass> <CMIP-1.ObjectClass> |
| indexFilterPart | → indexFilterItem \| indexFilterEqualities indexFilterItem |
| indexFilterEqualities | → indexFilterEquality indexFilterEqualities |
| indexFilterEquality >AttributeValue> | → equality <anIndexedAttributeId> |
| indexFilterItem | → indexFilterEquality \| indexFilterGreaterOrEqual \| indexFilterLessOrEqual \| indexFilterSubstring Initial |
| indexFilterGreaterOrEqual <AttributeValue> | → greaterOrEqual <anIndexedAttributeId> |
| indexFilterLessOrEqual <AttributeValue> | → lessOrEqual <anIndexedAttributeId> |
| indexFilterSubstringInitial <anIndexedAttributeId> <AttributeValue> | → substrings     InitialString |
| anyFilterItems | → <CMIP-1.CMISFilter> |

In this grammar, the order presented between the various items does not reflect a syntactic order in the expression of the CMIS filter, which can be any order, but rather the physical order of the attributes as they exist in the indexes of the optimized MOC.

When a pre-filtering can be used, the query performer (37) of the management information base (MIB query performer) reads in the underlying base only the subordinates that are indexed by the values of the attributes selected for the pre-filtering. Then, the query performer (37) of the management information base (MIB query performer) evaluates the filter on each previously selected instance. If the evaluation is positive, it executes the operation on the logical representation of the management information base (MIB) and returns the individual response to the handler of said common information management service (CMIS handler) (31) or to the program development kit (MIB toolkit) (34).

The ISAM structure of the records for storing the MOIs of the optimized classes is that of the generic representation of the MOIs, with which is concatenated the attribute or attributes to be used in the secondary indexes specified by the user via the objects mocStorageDefinition. The structure of these additional fields "indexableAttributeList" is as specified below:

| byte | 0 | 3 | 4 | N | |
|---|---|---|---|---|---|
| field | fatherMOInodeRef 4 bytes | | IndexableAtributeList N = 4 + sum of the lengths of each attribute | | FDNofMOI AttributeList n bytes m bytes |
| index | primary index ISDUPS DCOMPRESS | | M secondary indexes | | |

| where indexableAttributeList has the following structure: | | | | |
|---|---|---|---|---|
| 4 | 7 | 8 | | |
| fatherMOInodeRef 4 bytes (long) ISDUPS DCOMPRESS | Attribute 1 n1 bytes the secondary indexes depend on the types of values | | — | Attribute i n2 bytes |

In the field IndexableAttributeList, which can be used to activate secondary indexes, the values of the indexable attributes are stored.

Figure 5:
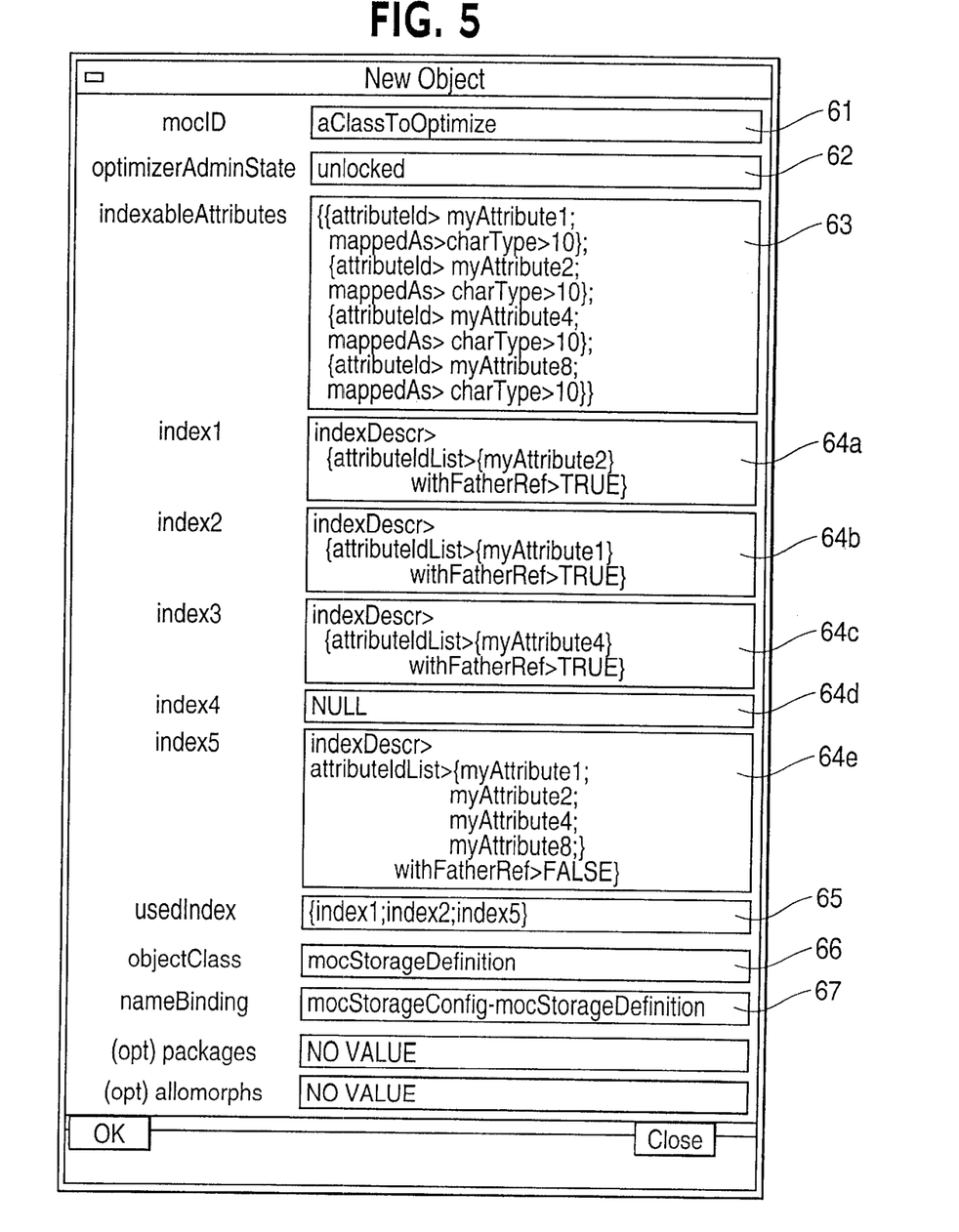
FIG. 5 represents a window displaying an object instance d' of class "mocStorageDefinition" generated by a graphical user interface (GUI) that is part of ISM Monitor and that allows the definition and the activation or deactivation of indexed attributes of an optimized object class.

FIG. 5 represents an instance of the class "mocStorage Definition" displayed on the screen of the terminal by a graphical interface, allowing the user to access the manager of CMIS-DB. This window allows the user to define the indexable attributes, to sort them in order of discrimination, the choice of the most discriminating attribute being established by declaration in the object mocStorageDefinition in decreasing order of the attributes to be indexed.

Thus, this window (61) is produced by ISM-Monitor, which makes it possible to display a first box containing a first attribute (61, opClassO) constituting, by definition, the identifier "mocId" of the optimized object class. A second box (62) displays the state attribute of the optimization function and may also make it possible to change from the active (unlocked) state to the inactive (locked) state. In the latter state, the optimization function, i.e., the pre-filtering stage, is not used. A third box (63) makes it possible to display or to create the list of indexable attributes, for example indicating for each attribute in the list the name of the attribute "AttributId", and possibly to declare, if necessary, the physical structure of the index using the information "mappedAs>simple ISAMtype>inttype or mappedAs>simple ISAMtype>doubletype", which in this case indicates that the physical representation of the attribute is the double type.

A first index box (64a) makes it possible to define the first index, i.e., the index considered by the manager of CMIS-DB to be the most discriminating. Each box (64a through 64e) allows the definition of five different index levels and makes it possible to describe an index configuration in this case comprising indexes (64a, 64b, 64c), one or in the case of the index (64e) several attributes, or none in the case of the index (64d). In this last case, the fourth index (64d), which does not contain any attribute n', does not exist. Each box (64a through 64e) can also receive information linking the index with the father of the object (withfatherRef>TRUE). In FIG. 5, the index (64d) comprises an unused field "CMIS null", which indicates that the optimized class comprises only four configured indexes. A field (65) makes it possible to define the indexes used and to activate them according to the user's needs. A field (66) indicates the name of the class of the object. A field (67) makes it possible to define the name binding with the class "mocStorageConfiguration".

Thus, it is understood that the user, by declaring the indexed attributes in decreasing order, can influence the choice of the most discriminating attributes and obtain different results in terms of the speed of evaluating a scope operation or a "filter" operation.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for optimizing accesses to a database, comprising:

requesting a common management information server-database (CMas-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which the user declares one or more attributes of the object class to be optimized, and indexing the one or more attributes when physically stored on a disk, and wherein the object class to be optimized represents a type of network resource and each object therein represents a piece of equipment of the network.

2. A process for optimizing accesses to a database according to claim 1, further comprising a second step including writing one ISAM (Index Sequential Access Method) file per managed object class (MOC) optimized, said file being specific with its own index structure containing the representation of all the instances of the respective managed object class (MOC).

3. A process for optimizing accesses to a database according to claim 1, wherein the storage definition class (mocStorageDefinition) makes it possible to specify for a managed object class (MOC) to be optimized, a plurality of indexable attributes that are physically stored in the index the moment the object is created.

4. A process for optimizing accesses to a database according to claim 3, wherein indexes specified in the storage definition class (mocStorageDefinition) can be modified at any time via an online configuration of the CMIS-DB server by assigning a different index level to one or more attributes or by activating or deactivating the indexes via the modification of the object of class (mocStorageDefinition).

5. A process for optimizing accesses to a database, comprising:

requesting a common management information server-database (CMIS-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which are declared one or more attributes of the object class to be optimized, and indexing the one or more attributes when physically stored on a disk; and a step including analyzing filters conveyed by common management information service (CMIS) operations sent by users in order to identify, in a pre-filtering step, whether or not evaluation of said filters can be performed using an index set in the database.

6. A process for optimizing accesses to a database according to claim 5, wherein when a pre-filtering by attributes indexed in the underlying database can be used, a query performer of the management information base determines the arguments of a physical read operation, allowing reading in the underlying base only the subordinates that are indexed by the values of the attributes selected for the pre-filtering.

7. A process for optimizing accesses to a database according to claim 5, wherein a module that performs a common management information service (CMIS) operation performs an analysis of a CMIS filter given as an argument of a query, making it possible to detect whether a pre-filtering through a reading in the underlying database of a subset of the objects of the scope is possible and, if so, physically reading by the module only the objects of the scope that are indexed by values of attributes selected for the pre-filtering.

8. A process for optimizing accesses to a database according to claim 7, wherein a most discriminating attribute or group of attributes is designated by a user sorting defined indexes in a decreasing order.

9. A process for optimizing accesses to a database, comprising:

requesting a common management information server-database (CMIS-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which are declared one or more attributes of the object class to be optimized, and indexing the one or more attributes when physically stored on a disk;

a second step including writing one ISAM (Index Sequential Access Method) file per managed object class (MOC) optimized, said file being specific with its own index structure containing the representation of all the instances of the respective managed object class (MOC); and a third step including analyzing filters conveyed by common management information service (CMIS) operations sent by users in order to identify, in a pre-filtering step, whether or not evaluation of said filters can be performed using an index set in the database.

10. A process for optimizing accesses to a database according to claim 9, wherein when a pre-filtering by attributes indexed in the underlying database can be used, a query performer of the management information base determines the arguments of a physical read operation, allowing reading in the underlying base only the subordinates that are indexed by the values of the attributes selected for the pre-filtering.

11. A process for optimizing accesses to a database according to claim 9, wherein a module that performs a common management information service (CMIS) operation performs an analysis of a CMIS filter given as an argument of a query, making it possible to detect whether a pre-filtering through a reading in the underlying database of a subset of the objects of the scope is possible and, if so, physically reading by the module only the objects of the scope that are indexed by values of attributes selected for the pre-filtering.

12. A process for optimizing accesses to a database according to claim 11, wherein a most discriminating attribute or group of attributes is designated by a user sorting defined indexes in a decreasing order.

13. A process for optimizing accesses to a database, comprising:
   requesting a common management information server-database (CMIS-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which are declared one or more attributes of the object class to be optimized, and indexing the one or more attributes when physically stored on a disk,
   wherein the value of physical indexes for the attributes specified in the object instance of the storage definition class (mocStorageDefinition) corresponding to the managed object class (MOC) to be optimized includes a unique reference of the node of the father instance (fatherMoInodeRef) of the managed object instance, four bytes long in the case of physical storage in an ISAM file, and the sequence of the attributes 1 to i necessary to the managed object class (MOC) to be optimized.

14. A process for optimizing accesses to a database according to claim 13, wherein a module that performs a common management information service (CMIS) operation performs an analysis of a CMIS filter given as an argument of a query, making it possible to detect whether a pre-filtering through a reading in the underlying database of a subset of the objects of the scope is possible and, if so, physically reading by the module only the objects of the scope that are indexed by values of attributes selected for the pre-filtering.

15. A process for optimizing accesses to a database according to claim 14, wherein a most discriminating attribute or group of attributes is designated by a user sorting defined indexes in a decreasing order.

16. A process for optimizing accesses to a database, comprising:
   requesting a common management information server-database (CMIS-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which are declared one or more attributes of the object class to be optimized, and indexing the one or more attributes when physically stored on a disk,
   wherein a module that performs a common management information service (CMIS) operation performs an analysis of a CMIS filter given as an argument of a query, making it possible to detect whether a pre-filtering through a reading in the underlying database of a subset of the objects of the scope is possible and, if so, physically reading by the module only the objects of the scope that are indexed by values of attributes selected for the pre-filtering.

17. A process for optimizing accesses to a database according to claim 16, wherein a most discriminating attribute or group of attributes is designated by a user sorting defined indexes in a decreasing order.

18. A process for optimizing accesses to a database according to claim 17, employing an optimizer for recognizing filters for pre-filtering indexes, said filters being constituted by an AND clause including:
   an equality item in the attribute objectClass, a value equal to the identifier of one of the optimized MOCS, and
   a logical expression constituted only by AND clauses including comparison items in attributes declared in the indexes of the optimized MOC.

19. A process for optimizing accesses to a database according to claim 16, employing an optimizer for recognizing filters for pre-filtering indexes, said filters being constituted by an AND clause including:
   an equality item in the attribute objectClass, a value equal to the identifier of one of the optimized MOCs, and
   a logical expression constituted only by AND clauses including comparison items in attributes declared in the indexes of the optimized MOC.

20. A process for optimizing accesses to a database, comprising:
   requesting a common management information server-database (CMIS-DB) server, via an online configuration, by a client application, to customize a generic representation of an object class for which access times are to be optimized in order to reduce search times for object instances selected, by performing a first step of configuring physical storage of the object class to be optimized, said first step including generating an object instance of a storage definition class (mocStorageDefinition) in which are declared one or more attributes of the object class to be optimized, and indexing the one or more attributes when physically stored on a disk; and
   a second step including writing one ISAM (Index Sequential Access Method) file per managed object class (MOC) optimized, said file being specific with its own index structure containing the representation of all the instances of the respective managed object class (MOC),
   wherein a module that performs a common management information service (CMIS) operation performs an analysis of a CMIS filter given as an argument of a query, making it possible to detect whether a pre-filtering through a reading in the underlying database of a subset of the objects of a defined scope is possible and, if so, physically reading by the module only the objects of the scope that are indexed by values of attributes selected for the pre-filtering.

21. A process for optimizing accesses to a database according to claim 20, wherein a most discriminating attribute or group of attributes is designated by a user sorting defined indexes in a decreasing order.

22. In a computer network having a common management information server-database (CMIS-DB) server and a plurality of client terminals, each having communication access to the server via an on-line configuration and to other pieces of equipment of the network which are represented by corresponding object instances in a hierarchical structure of the database, a method of optimizing access times to the database in order to reduce search times for selected object instances, said method comprising:
   requesting the server, via a client terminal, to customize a generic representation of an object class by a step of configuring physical storage of the object clams, the object class representing a type of network equipment and each object instance therein representing a piece of network equipment, said step including generating an object instance of the object class (mocStorageDefinition), inputting user-declared attributes of the object class, and indexing the attributes when physically stored on a storage medium.

* * * * *

UNITED STATES PATENT AND TRADEMARK OFFICE
CERTIFICATE OF CORRECTION

PATENT NO.    : 6,484,160 B1
DATED         : November 19, 2002
INVENTOR(S)   : Richard et al.

It is certified that error appears in the above-identified patent and that said Letters Patent is hereby corrected as shown below:

<u>Column 13,</u>
Line 16, delete "(CMas-DB)" and substitute with -- (CMIS-DB) --;

Signed and Sealed this

Eighth Day of April, 2003

JAMES E. ROGAN
*Director of the United States Patent and Trademark Office*